(12) United States Patent
Stephens

(10) Patent No.: US 6,830,439 B2
(45) Date of Patent: Dec. 14, 2004

(54) ELECTRIC FUEL PUMP WITH UNIVERSAL RELIEF VALVE INSTALLED IN THE PUMP INLET

(75) Inventor: Bruce Stephens, Fairfield, IL (US)

(73) Assignee: Airtex Products, Fairfield, IL (US)

( * ) Notice: Subject to any disclaimer, the term of this patent is extended or adjusted under 35 U.S.C. 154(b) by 40 days.

(21) Appl. No.: 10/324,287

(22) Filed: Dec. 19, 2002

(65) Prior Publication Data

US 2003/0190239 A1 Oct. 9, 2003

Related U.S. Application Data

(60) Provisional application No. 60/370,779, filed on Apr. 8, 2002.

(51) Int. Cl.[7] .................................. F04B 35/04
(52) U.S. Cl. ................. 417/307; 417/423.3; 417/440
(58) Field of Search ........................ 417/307, 310, 417/360, 410.1, 440, 283, 423.1, 423.3; 123/463, 446, 497, 456, 506; 384/206, 218; 137/565.22, 115.13, 454.6, 540

(56) References Cited

U.S. PATENT DOCUMENTS

| 4,049,017 A | * | 9/1977 | Jones ........................ 137/540 |
| 4,352,641 A | | 10/1982 | Tuckey |
| 4,401,416 A | | 8/1983 | Tuckey |
| 4,447,192 A | | 5/1984 | Tuckey |
| 4,820,139 A | | 4/1989 | Tuckey |
| 4,936,339 A | * | 6/1990 | Bennett .................... 137/454.6 |
| 4,997,345 A | * | 3/1991 | Dahlmann .................. 417/282 |
| 5,579,739 A | | 12/1996 | Tuckey et al. |
| 5,630,399 A | * | 5/1997 | Nomura et al. ............. 123/467 |
| 5,651,347 A | * | 7/1997 | Oi et al. ..................... 123/487 |
| 5,966,970 A | * | 10/1999 | Mooney ...................... 70/242 |
| 5,979,409 A | * | 11/1999 | Robinson .................... 123/463 |
| 6,352,067 B1 | * | 3/2002 | Genslak ..................... 123/510 |
| 6,460,826 B1 | * | 10/2002 | Rezvani ..................... 251/291 |

* cited by examiner

*Primary Examiner*—Charles G. Freay
(74) *Attorney, Agent, or Firm*—Polster, Lieder, Woodruff & Lucchesi, L.C.

(57) ABSTRACT

A universal relief valve assembly (30) installed in an electric fuel pump (10) for returning fuel from an outlet portion (16) of the fuel pump back to the inlet side of the pump. A cartridge (32) is mounted in the pump and has an opening (34) extending therethrough for fuel to flow from the outlet portion of the pump back to the inlet portion of the pump. A relief valve (42) installed in the cartridge is movable from a closed position to an open position by the pressure to which the relief valve is subjected. A valve spring (52) installed in the cartridge biases the relief valve closed. The cartridge is sized to fit into a variety of fuel pumps having a range of outlet pressures, so to reduce the number of relief valve assemblies required to manufacture a line of fuel pumps.

11 Claims, 3 Drawing Sheets

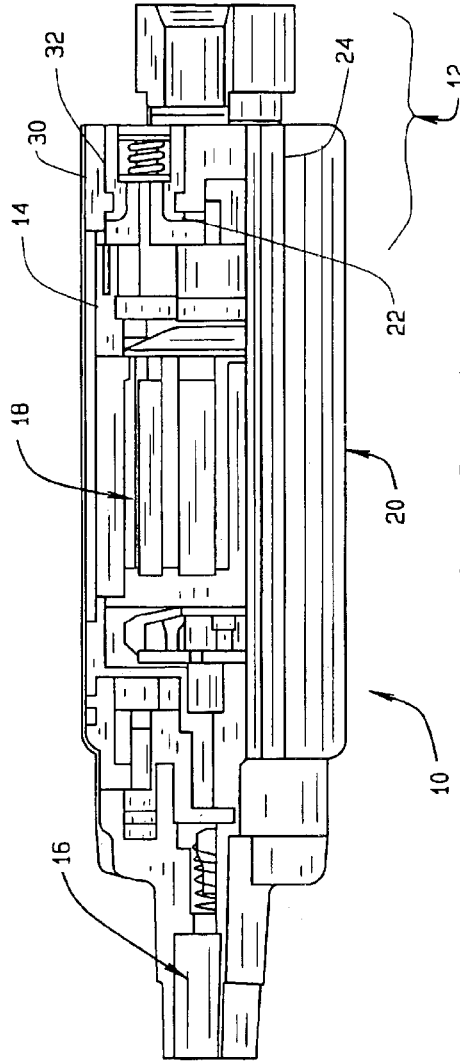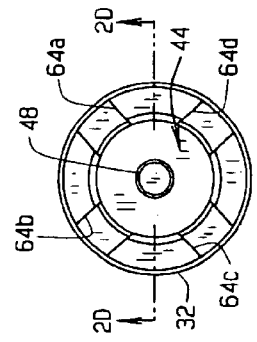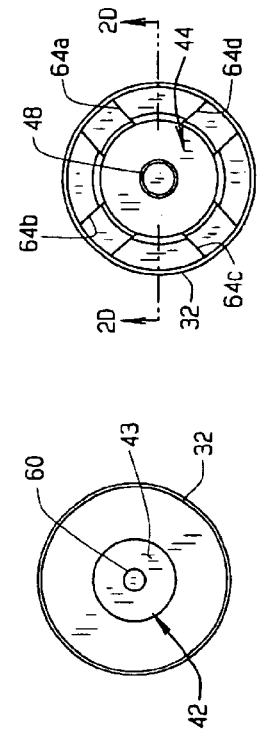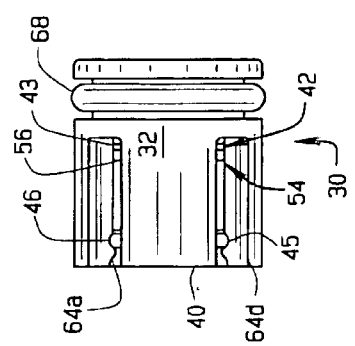

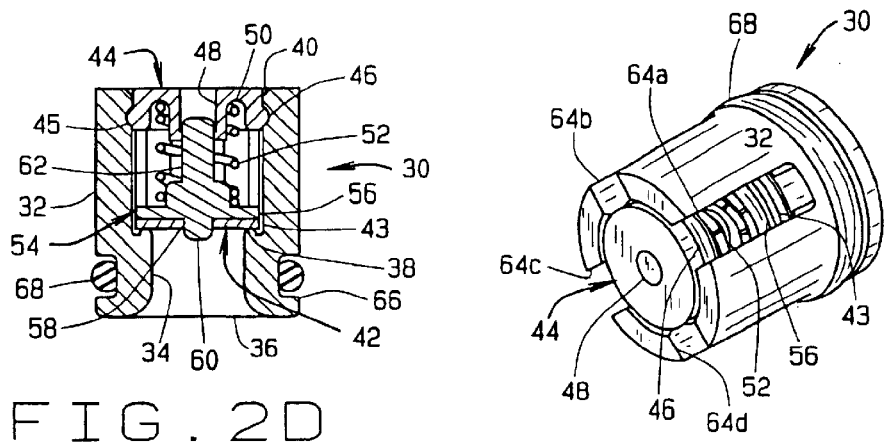
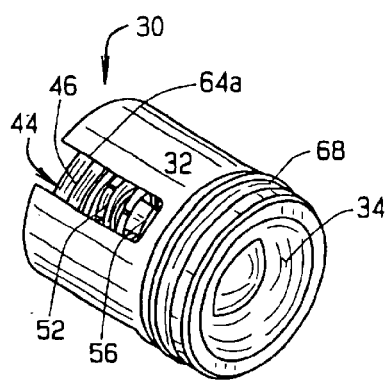
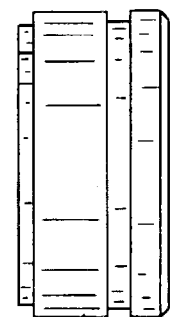
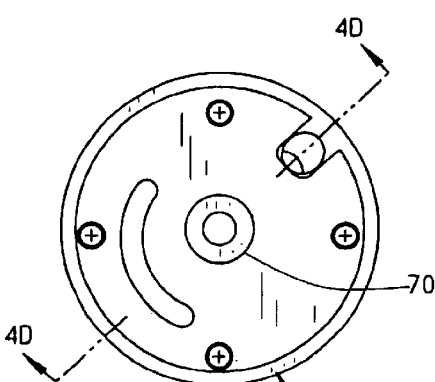

ELECTRIC FUEL PUMP WITH UNIVERSAL RELIEF VALVE INSTALLED IN THE PUMP INLET

CROSS REFERENCE TO RELATED APPLICATIONS

Provisional U.S. patent application No. 60/370,779 filed Apr. 8, 2002.

STATEMENT REGARDING FEDERALLY SPONSORED RESEARCH OR DEVELOPMENT

N/A

BACKGROUND OF THE INVENTION

This invention relates to electric fuel pumps used to supply fuel to internal combustion engines, and more particularly to a cartridge insertable in the inlet of a variety of such pumps to provide a relief valve assembly for the pumps. At low pressures (12 psi or less) such as occur in carbureted engine applications, the relief valve also acts as a pressure regulator. At higher pressure applications such as found in fuel injected engines, the valve acts to relieve excess pressure in the fuel rail between the fuel pump and engine should the pressure regulator in the rail fail, or if a fuel line becomes kinked or is otherwise blocked.

Electric fuel pumps are well-known in the art. The pump has an inlet side in which fuel is drawn into the pump at low pressure. The pump then has one or more pumping stages by which the fuel pressure is elevated to a significantly higher level. Finally, the pump has an outlet stage through which the pressurized fuel is delivered to an internal combustion engine, typically a fuel injected engine, requiring fuel at high pressure for proper operation. As noted, the fuel pumps are also usable in carbureted engine applications. The fuel pump can be mounted either inside or outside the fuel tank. Electric fuel pumps include a relief valve for directing fuel back to a fuel tank in which the pump is installed. In many pump constructions, the relief valve assembly is mounted in the inlet portion of the pump, and the fuel returned back to the inlet side of the pump through the relief valve is high pressure fuel from the outlet side of the pump.

It will be appreciated that there are wide variety of fuel pumps for different engine applications. The pumps are of different sizes and shapes and their outlet pressures vary over a wide range; i.e., from 100 psi or greater, to less than 10 psi. Because of this diversity, it is commonplace in manufacturing a line of fuel pumps for a manufacturer to have to stock a large number of different parts for use in their production. This makes inventory costs very high and can be particularly expensive because a few part numbers usually represent the vast portion of the sales volume; yet, many more part numbers must be made and stocked to complete the product line. The ability to utilize a single component throughout much of the product line would create significant cost savings. The impact would be not only in inventory costs, but also in production because fewer fixtures would be required, and less setup changes and machining operations would be involved in changing from one part number to another.

BRIEF SUMMARY OF THE INVENTION

The present invention is directed to a relief valve assembly for electric fuel pumps. The assembly includes a molded plastic cartridge in which components of the relief valve are housed. The cartridge is readily inserted in the inlet porting plate of a wide variety of fuel pumps to direct high pressure fuel from the outlet side of the pump back to the inlet side of the pump. Using different springs within the cartridge allows the relief valve to be modified for use in pumps operating at different pressures. This can also be accomplished by changing the size of the inlet orifice of the cartridge. The combination of spring weights and orifice sizes enables a relief valve of a common design to be used in a variety of different pumps.

The housing of the cartridge is designed to readily fit into a porting plate so to simplify manufacture of a pump. Preferably, the cartridge is made of a light weight, slotted plastic material which is impervious to fuel varnish buildup which causes sticking of the relief valve. Slotting allows the cartridge to easily bypass fuel back to the inlet side of the pump when the relief valve is opened. The cartridge is color coded for ease of identification. Since the relief valve components are self-contained within the cartridge, they are readily tested prior to installation into a pump.

Other objects and features are in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 1 is an elevation view, partly in section, of an electric fuel pump;

FIGS. 2A–2D are an elevation view of a relief valve assembly of the present invention (FIG. 2A), respective end views of a cartridge housing relief valve components (FIGS. 2B and 2C), and a sectional view (FIG. 2D) of the cartridge taken along line 2D—2D in FIG. 2C;

FIGS. 3A and 3B are perspective views of the cartridge from opposite ends of the cartridge;

FIGS. 4A–4E are elevation views of a porting plate for a fuel pump in which the relief valve assembly is installed (FIG. 4A), respective end views of the porting plate (FIGS. 4B and 4C), a sectional view (FIG. 4D) of the porting plate taken along line 4D—4D in FIG. 4B, and a sectional view (FIG. 4E) of the porting plate taken along line 4E—4E in FIG. 4C; and, FIG. 5 is a perspective of the cartridge with a different valve seating construction.

Corresponding reference characters indicate corresponding parts throughout the several views of the drawings.

DETAILED DESCRIPTION OF INVENTION

Figure 4C:
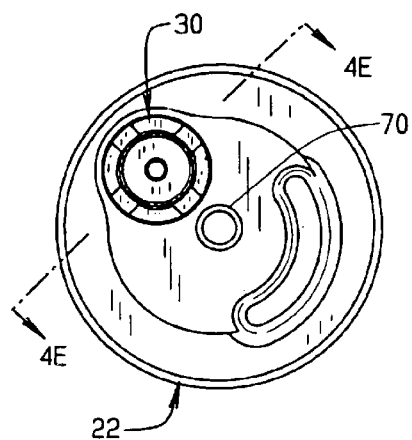
Figure 4D:
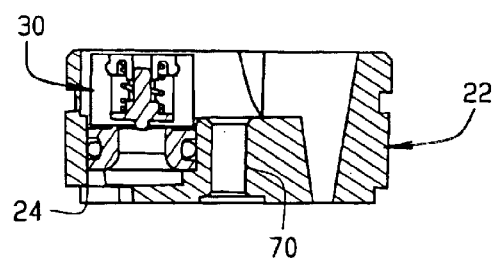
Figure 4E:
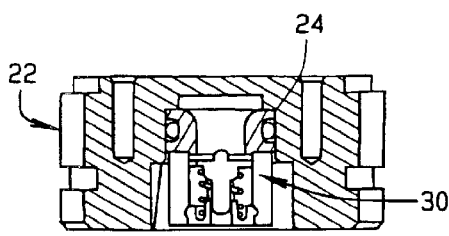

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring to FIG. 1, an electric fuel pump 10 pumps fuel from the fuel tank of a vehicle to an internal combustion engine (also not shown) powering the vehicle. The fuel pump can be either mounted in the tank, or externally of it.

The pump has an inlet section 12 by which fuel is drawn into the pump by suction, a pumping section 14 in which the fuel pressure is increased from the nominal fuel pressure in the tank to a desired higher pressure level, and a fuel outlet 16 through which the pressurized fuel is pumped to the engine. In fuel injected engine applications, a pressure regulator (not shown) is installed in the fuel path between the pump and engine. An electric motor 18 operates the pump. The electric motor and other fuel pump components are enclosed in a housing 20.

In accordance with the present invention, a universal valve is indicated generally 30 in FIG. 1. Valve 30 is a relief valve and utilizes a cartridge 32 sized to be received in the fuel inlet portion of the pump. Housed in the cartridge are relief valve components by which fuel flows from the high pressure, outlet side of the pump back to the inlet side of the pump. It is a feature of the invention that cartridge 32, which is of a molded plastic material, fits in a wide range of fuel pumps. Accordingly, while certain elements housed in the cartridge vary depending upon the desired performance characteristics of the fuel pump, universal valve 30 significantly reduces the inventory of parts needed to manufacture a line of fuel pumps and substantially reduces manufacturing costs in assembling fuel pumps.

In FIG. 1, fuel inlet portion 12 of pump 10 includes a porting plate 22. Plate 22 includes a recess 24 and cartridge 32 is sized to be received in this recess during pump assembly. The universal relief valve is installed in the porting plate during a sub-assembly operation, and the porting plate with the relief valve assembly are then installed in fuel pump housing 20 during a final assembly operation.

Cartridge 32 has a hollow core 34 extending the length of the cartridge. Core 34 is of a first diameter at the inlet end 36 of the cartridge. As shown in the drawings, the entrance end of the core curves inwardly from the inlet end of the cartridge. A valve seat 38 comprises a circumferential seat formed approximately midway along the length of the cartridge. The diameter of core 34 from the location of the seat to the other, outlet end 40 of the cartridge is greater than the core diameter at the inlet end of the relief valve assembly.

A plate 42 of the assembly is comprised of a disk 43 made of a plastic material which is resistant to fuel varnish buildup. This prevents relief valve sticking. A cover plate 44 is insertable into end 40 of the cartridge. A circular recess 45 is formed in the sidewall of core 34 inwardly of end 40 of the core. Cover plate 44 has a circumferentially extending shoulder 46 adjacent the inner end of the plate when the plate is inserted into end 40 of the core. The diameter of the cover plate at the location of shoulder 46 is greater than the diameter of the core at end 40. However, the plastic material from which cartridge 32 is made is sufficiently flexible that the plate can be snap fit into place with shoulder 46 being received in recess 45. Plate 44 has a central opening 48 extending completely through the plate. At the inner end of the installed plate is a circular recess 50 comprising a seat for a valve spring 52.

Relief valve 30 also has an associated backing plate 54. Plate 54 comprises a circular disk 56 of the same diameter as disk 43 and abuts against the backside of disk 43. Disk 43 has a central opening 58 through which a central hub 60, formed in the center of disk 56, protrudes. A stem 62 is formed on the backside of disk 56, the lower portion of the stem extending into the opening 48 formed in cover plate 44. Valve spring 52 extends about stem 62, and the other end of the spring seats against the backside of disk 56. Spring 52 urges backing plate 54 and relief valve 42 against valve seat 38 so to close off the relief valve.

Four slots 64a–64d are formed in the side of cartridge 32. It will be understood by those skilled in the art, that there may be more or fewer than four slots without departing from the scope of the invention. The slots extend longitudinally of the cartridge from end 40 of the cartridge to a location adjacent the outer end of relief valve disk 43. Preferably, the slots are formed in the cartridge 90° apart. The slots provide fuel flow paths back from the outlet side of the fuel pump to the inlet side of the pump when relief valve 42 is opened. The material forming the sidewall of the cartridge, at the end of the cartridge adjacent the outer ends of the slots, is shown to be slightly curved. This curvature facilitates insertion of cover plate 44 when the relief valve is assembled.

A circular recess 66 is formed on the outer surface of cartridge 32 adjacent the inner end of the relief valve assembly when the cartridge is installed in recess 24 of inlet section 12 of the fuel pump. An O-ring seal 68 fits in the recess and provides a seal between the relief valve assembly and the sidewall of recess 24.

In operation, relief valve 42 is normally closed by valve spring 52. The amount of force holding the relief valve closed is a function of the spring 52 used in the assembly. When the fuel pressure in a fuel rail exceeds a predetermined level, the pressure regulator in the fuel line diverts fuel back to the inlet side of the pump. Now, fuel from the outlet side of pump 10 is directed into the relief valve assembly. The fuel pressure overcomes the force imposed on the relief valve by the spring, moving valve disk 43 away from seat 38. Return fuel now flows through the inlet of the cartridge, about the valve disk, through the slots 64a–64d formed in the side of the cartridge, and back to the carbureted engines, where there is typically no pressure regulator, relief valve 30 functions as the pressure regulator. A portion of the fuel from the outlet side of the fuel pump is directed to the relief valve assembly. If the pressure of the fuel exceeds approximately 12 psi, the relief opens as above described to drain fuel back to the inlet side of the tank.

The advantages of relief valve assembly 30, as above described, is that the cartridge fits into a large number of different fuel pumps. Preferably, the plastic material from which the cartridge is formed is of one or more desired colors. This color coding makes it easy to identify which cartridges fit into which fuel pumps during assembly. The interchangeability also reduces inventory costs. The difference between one relief valve assembly and another is the size of the spring 52, since this determines the amount of pressure which must be overcome to open the relief valve.

In FIGS. 4A–4E, porting plate 22 is shown to be a circular plate having a central opening 70 through which inlet fuel is drawn into pump 10 from the tank. The porting plate is bolted to the pump section of the fuel pump during assembly, prior to the pump components being fitted into pump housing 20. If the fuel pump is mounted in the fuel pump, return fuel flowing through the relief valve flows directly into the tank. If the fuel pump is mounted outside the tank, the excess flow is diverted back to the inlet side of the pump.

Figure 5:
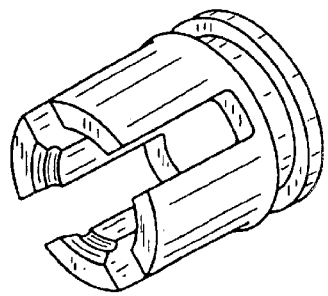

Finally, as shown in FIG. 5, the cartridge, rather than having a curved inlet construction can employ a stepped valve seating construction. The advantage of this construction over that previously described is more consistent pressure regulation.

In view of the above, it will be seen that the several objects and advantages of the present invention have been achieved and other advantageous results have been obtained.

Having thus described the invention, what is claimed and desired to be secured by Letters Patent is:

1. In an electric fuel pump for drawing fuel from a fuel tank, pressurizing the fuel, and supplying the pressurized fuel to an engine, a universal relief valve assembly for diverting fuel from an outlet portion of the fuel pump back to the inlet side of the pump, comprising:

a cartridge mounted in the fuel pump, the cartridge having a hollow core and an opening extending therethrough for fuel to flow from an outlet portion of the pump back to an inlet side of the pump;

a relief valve installed in the cartridge and movable from a closed position to an open position by the pressure to which the relief valve is subjected, the relief valve having a valve seat formed intermediate a length of the cartridge with a diameter of the core from an inlet end of the cartridge being of one diameter, and a diameter of the core from the location of the valve seat to the other end of the cartridge being of a second and greater diameter; and, means, installed in the cartridge, for biasing the relief valve closed, the cartridge being sized to fit into a variety of fuel pumps so to reduce the number of relief valve assemblies required to manufacture a line of fuel pumps, the cartridge further including a valve spring and a cover plate fitted into an outlet end of the cartridge, the cover plate having a central opening extending therethrough and a circular recess comprising a seat for the valve spring.

2. The relief valve assembly of claim 1 in which the fuel pump includes a porting plate installed on the inlet side of the pump, and the cartridge is mounted in the porting plate.

3. The relief valve assembly of claim 1 in which the cartridge is color coded so an assembler can readily identify which cartridge is installed in which pump.

4. The relief valve assembly of claim 1 in which the means for biasing the relief valve closed includes one of a plurality of springs each of which causes the relief valve to open at a different fuel pressure.

5. The relief valve assembly of claim 1 in which a relief valve of the assembly comprises a valve disk of a plastic material so to resist fuel varnish buildup and prevent relief valve sticking.

6. The relief valve assembly of claim 1 in which the relief valve further includes a backing plate comprising a circular disk of the same diameter as the valve disk and which abuts against the backside of disk valve.

7. The relief valve assembly of claim 6 in which the valve disk has a central opening therethrough through which a central hub formed in the center of the backing plate protrudes.

8. The relief valve assembly of claim 7 wherein a stem is formed on the backside of the backing plate, a lower portion of the stem extending into the opening formed in the cover plate (44), the valve spring extending about the stem, and one end of the spring seating against the backing plate, the spring urges the backing plate and relief valve against the valve seat to close off the relief valve.

9. The relief valve assembly of claim 8 further including a plurality of slots formed in the side of the cartridge and extending longitudinally of the cartridge from a location adjacent the outer end of the valve disk to the outlet end of the cartridge, the slots providing fuel flow paths back from the outlet side of the fuel pump to the inlet side thereof when the relief valve is opened.

10. The relief valve assembly of claim 9 wherein a sidewall of the cartridge, at the end of the cartridge adjacent outer ends of the slots, is curved to facilitate insertion of the cover plate into the cartridge when the relief valve is assembled.

11. The relief valve assembly of claim 9 further including a circular recess formed on an outer surface of the cartridge adjacent an inner end of the relief valve assembly when the cartridge is installed in the fuel pump, and a seal received in the recess.

* * * * *